United States Patent [19]

Schütz et al.

[11] Patent Number: 4,915,733

[45] Date of Patent: Apr. 10, 1990

[54] AGGLOMERATED METAL COMPOSITE POWDERS

[75] Inventors: Heinz-Eckert Schütz, Goslar; Bernhard Szesny, Langelsheim; Bruno E. Krismer, Goslar, all of Fed. Rep. of Germany

[73] Assignee: Hermann C. Starck Berlin GmbH & Co. KG, Werk Goslar, Fed. Rep. of Germany

[21] Appl. No.: 298,995

[22] Filed: Jan. 19, 1989

[30] Foreign Application Priority Data

Jan. 30, 1988 [DE] Fed. Rep. of Germany ....... 3802811

[51] Int. Cl.⁴ .............................................. C22C 28/00
[52] U.S. Cl. ........................................ 75/228; 75/229; 75/255
[58] Field of Search ........... 75/228, 229, 255, 0.5 AB; 419/23, 32, 34

[56] References Cited

U.S. PATENT DOCUMENTS

| | | | |
|---|---|---|---|
| 2,431,691 | 12/1947 | Newman | 266/252 |
| 3,418,103 | 12/1968 | Lasdon | 75/0.5 AB |
| 3,652,746 | 3/1972 | Bargainnier | 264/14 |
| 3,663,667 | 5/1972 | Cheney et al. | 264/14 |
| 4,216,009 | 8/1980 | Miyake et al. | 75/0.5 AB |
| 4,384,884 | 5/1983 | Miyake et al. | 75/0.5 AB |
| 4,498,395 | 2/1985 | Kock et al. | 428/570 |
| 4,584,078 | 4/1986 | Nakanouchi et al. | 75/255 |
| 4,613,371 | 8/1986 | Cheney et al. | 75/255 |
| 4,678,511 | 7/1987 | Yasuoka et al. | 75/255 |
| 4,775,414 | 10/1988 | Shoji | 75/255 |

FOREIGN PATENT DOCUMENTS

| | | |
|---|---|---|
| 98944 | 4/1984 | European Pat. Off. |
| 2078508 | 11/1971 | France |
| 73202 | 9/1953 | United Kingdom |

Primary Examiner—L. Dewayne Rutledge
Assistant Examiner—David W. Schumaker
Attorney, Agent, or Firm—Connolly and Hutz

[57] ABSTRACT

Metal powder agglomerates of individual particles comprising (i) more than 70% by weight of one or more metals selected from the group consisting of the elements molybdenum, rhenium and tungsten and (ii) one or more binder metals selected from the group consisting of iron, cobalt, nickel, copper, silver, gold, palladium, platinum, rhodium, chromium and rhenium, wherein the individual particles have grain sizes of less than 2 μm and all the metal particles lie side by side in uniform random distribution are useful as the powder required for producing shaped, sintered articles in a powder metallurgical preparation.

3 Claims, 2 Drawing Sheets

AGGLOMERATED METAL COMPOSITE POWDERS

This invention relates to metal powder agglomerates of individual particles, more than 80% by weight of which consist of one or more metals of the elements molybdenum, rhenium and tungsten and binder metals from the group comprising iron, cobalt, nickel, copper, silver, gold, palladium, platinum, rhodium, chromium and rhenium, to a process for the preparation of these metal powder agglomerates and to their use.

BACKGROUND OF THE INVENTION

Modern sintered materials are becoming increasingly important and the properties required of the material demand repeated optimization of what are in many cases contradictory properties, such as hardness and toughness. Since an increase in hardness can generally be obtained in metallic materials, composite materials and pseudo alloys by reducing the grain size, there is a marked trend in the technology of materials to produce ever finer grained types of materials.

The literature gives examples of processes, in particular for the production of contact materials (e.g. H. Schreiner, "Pulvermetallurgie elektrischer Kontakte", publishers Springer-Verlag Berlin, Göttigen, Heidelberg 1964) in which composite materials (e.g. AgNi, AgCdO) may first be obtained as sparingly soluble compounds by conventional chemical precipitation from salt solutions and these sparingly soluble compounds may be decomposed by a subsequent heat treatment and finally reduced to metal mixed powders.

Composite alloy powders consisting of tungsten metal particles with a thin shell of metals of the iron group elements are described in European 98,944.

These tungsten alloy powders which are capable of being sintered are produced by a special method of spray drying with simultaneous reduction by hydrogen at a temperature of at least 800° C., the starting materials consisting entirely of soluble compounds of the alloying elements. This process is therefore not universally applicable and disproportionately expensive on account of the large amount of energy required for the reaction spray drying. Moreover, reduction of the agglomerated oxides under free fall according to European 98,944 is difficult to control by means of the apparatus employed and requires great technical expenditure and high operating costs.

It was therefore an object of the present invention to provide metal powder agglomerates which do not have the disadvantages described above. The metal powder agglomerates according to the present invention fulfil these requirements.

BRIEF DESCRIPTION OF THE INVENTION

This invention relates to metal composite powders and a process for their preparation which are metal powder agglomerates of individual particles comprising (i) more than 70% by weight of one or more metals selected from the group consisting of the elements molybdenum, rhenium and tungsten and (ii) one or more binder metals selected from the group consisting of iron, cobalt, nickel, copper, silver, gold, palladium, platinum, rhodium, chromium and rhenium, wherein the individual particles have grain sizes of less than 2 m and all the metal particles lie side by side in uniform random distribution, prepared by dissolving or suspending homogeneously compounds of the metals and of the binder metals in ionic or non-ionic liquids, bringing the solution or suspension to dryness, whereafter the resulting solid residue is after-roasted at below 600° C. and subsequently converted to the metal powder under reducing conditions at temperatures from 600° to 1200° C.

Figure 1:
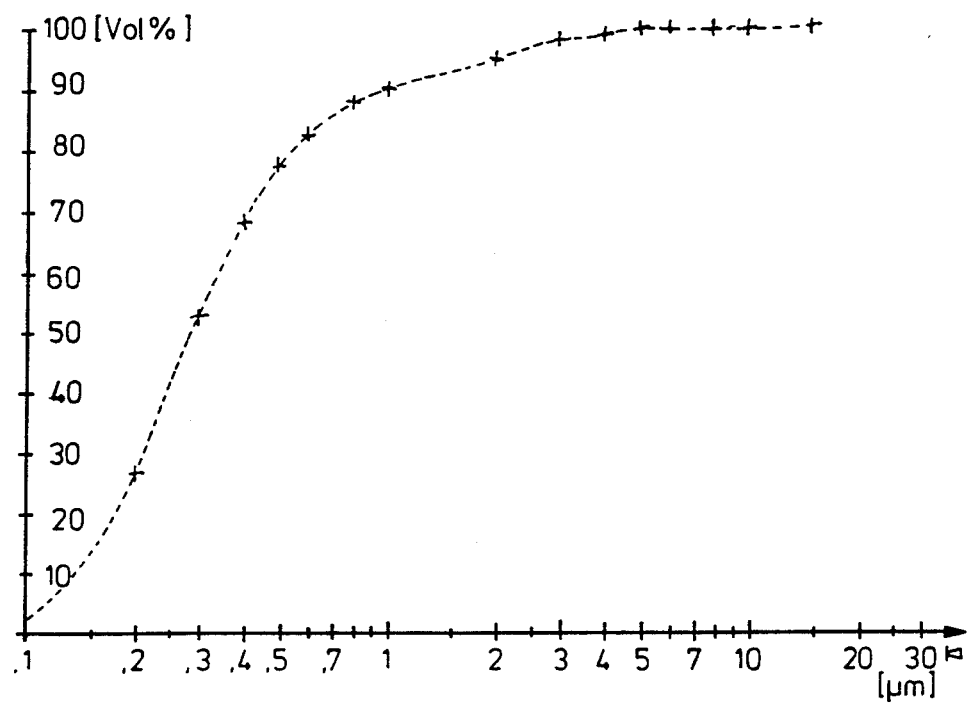
FIG. 1 is a graph graft illustrating the particle size distribution volume-wise for the product of Example 1.

This invention relates to metal powder agglomerates consisting to an extent of more than 70% of one and/or more metals of the elements, molybdenum, rhenium or tungsten and binders of the group comprising iron, cobalt, nickel, copper, silver, gold, palladium, platinum, rhodium, chromium and rhenium, characterised in that the individual particles have grain sizes of less than 2 $\mu$m and the metal particles are present side by side in uniform random distribution.

In a preferred embodiment, these metal powder agglomerates have an oxygen content of less than 1.5% by weight, preferably less than 1.0% by weight, the grain size of the agglomerates is less than 300 $\mu$m and the grain size of the individual particles is less than 1 $\mu$m, preferably less than 0.5 $\mu$m.

This invention also relates to processes for the preparation of the metal powder agglomerates according to the invention.

Suspensions, e.g. of oxides or hydroxides of the elements tungsten, molybdenum and rhenium may be used as preliminary stages for the recovery of the metal composite powders according to the present invention, but so may also their soluble compounds, e.g. ammonium salts such as ammonium metatungstate or ammonium molybdate or ammonium perrhenate in combination with soluble salts of the binder metals.

In one embodiment of the process according to the invention, the compounds of the metals and of the binder metals are dissolved in ionic or non-ionic liquids and/or homogeneously suspended therein, the solutions and/or suspensions are dried and the resulting solid residue is after-roasted at temperatures below 600° C. and finally converted into the metal powder at temperatures from 600° to 1200° C. under reducing conditions.

The metal compounds and binder metal compounds are preferably nitrates but the binder metals may also be used as insoluble compounds, e.g. in the form of their oxides and/or hydroxides.

A preferred embodiment of the process according to the invention is characterised in that oxides of the metals, Mo, Re and W and nitrates of the binder metals are used in a common, aqueous suspension.

According to one preferred variation of the process, the compounds of the metals Mo, Re and W are the ammonium salts of the acid anions of these metals and the compounds of the binder metals used are the nitrates, all used in a common, aqueous solution.

The compounds of the alloying base metals and of the binder metals are used in the form of solutions and/or suspensions in ionogenic or non-ionogenic liquids which are brought to a state of dryness to produce very homogeneous mixtures as preliminary substances and these may also be preroasted if necessary to form anhydrous mixtures of oxides.

In a particularly preferred embodiment of the process according to the invention, drying of the solutions and/or suspensions is carried out in spray drying apparatus. This spray drying may be followed by a thermal after-treatment to form oxide mixtures. The starting mixture must be vigorously stirred for a sufficient length of time to stabilize the suspension and must be obtained in a fluid state so as not to give rise to any trouble when it is subsequently spray dried.

The conditions of a "standard" spray drying installation (about 300° C.) are generally sufficient for the drying stage but this would have to be following by an additional pyrolysis stage at a temperature of at least 600° C. for the removal of residual anions from the homogeneous salt mixture.

According to a further preferred embodiment, drying of the solutions and/or suspensions is carried out by a freeze-drying process.

Other known starting mixtures may also be used but it is important to ensure a homogeneous distribution of the metal and binder metal compounds.

Since the known and well tried method of reduction with hydrogen is employed in the present process, it is not necessary to use special ovens but it has been found advantageous to use revolving tubular kilns which are suitable for continuous operation and are designed for very simple adjustment of the reaction parameters.

A preferred embodiment of the process according to the invention thus consists in that the reaction is carried out continuously in a revolving tubular kiln in a hydrogen atmosphere under reducing conditions.

The kilns employed must, of course, generally enable a closed gas atmosphere to be obtained, which must also be able to be used as an oxidizing (roasting) atmosphere, as will be clear from the process stages mentioned above. Pusher type furnaces in which solid bed reactions are passed through in crucibles or boats are also preferred forms of reduction apparatus.

In another preferred embodiment of the process according to the invention, the reaction is carried out as a semi-continuous process under reducing conditions in a pusher type furnace with boat.

Since soluble systems can be worked up just as troublefree as oxide suspensions with the same results, the process according to the invention may also be employed for producing alloyed mixed powders from systems which in the form of solutions contain undesirable anions such as chlorides and/or fluorides. Reaction spray drying of such elements would give rise to considerable environmental pollution and not least to problems of corrosion of the material of the reaction containers.

The reduction according to the invention of mixed oxides of Mo, W and Re with selected binder metal oxides in a stream of hydrogen at a temperature of maximally 850° C. gives rise to highly porous, very finely divided and therefore highly sintering active powder agglomerates with metal particles of the elements Mo, W and Re in the sub-micron range and matrix metal and alloy particles which are obtained as particularly fine grains or even in a radiographically amorphous form.

One or other of the elements mentioned as binder metals (e.g. rhenium) may also combine with the first mentioned metals (e.g. tungsten) at elevated temperatures to form alloys with mixed crystal phases. After the reduction stage, these are initially obtained as heterogeneous metal composite powders before they are converted into the homogeneous mixed crystal form in an additional stage of diffusion at a higher temperature.

For systems with a high chromium content as binder metal (above 10%), the reduction temperatures must be raised to 1000° C.

The agglomerated composite powders according to the invention are eminently suitable for the conversion by compression and sintering or other conventional processes of powder metallurgy into sintered products which are distinguished by their uniform structure, freedom from pores and extreme fineness of grain of the crystal structure. Such alloys therefore reach the highest grades in their mechanical properties such as tensile strength, bending strength, hardness, etc. Such combinations of properties are virtually unobtainable by conventional processes of powder metallurgy, i.e. by simply mixing finely divided starting components.

The metal composite powders according to the invention have a very high sintering activity and may advantageously be sintered to form pore-free products without the occurrence of liquid phases, and the structures obtained have grain sizes of less than 5 $\mu$m and a very narrow grain size distribution spectrum.

The heterogeneous tungsten/rhenium composite powders prepared by the process according to the invention were found to have a virtually ideal uniformity of distribution of the elements, tungsten and rhenium in the sintered product, in contrast to known powders of alloy mixtures, especially when homogeneous solutions of the starting materials were used. No such homogeneous distribution of elements has been obtainable in the production of tungsten/rhenium alloys by any of the powder metalurgical processes hitherto known in the art. Such alloys may be widely varied in their tungsten/rhenium ratio, provided that the starting metal compounds are homogeneous solutions.

This invention therefore also relates to the use of the metal powder agglomerates according to the invention for the powder metallurgical preparation of shaped products of sintered alloys.

The invention is described below with the aid of examples which are not to be regarded as limiting the idea of the invention.

EXAMPLE 1 (HEAVY METAL CAPABLE OF BEING SINTERED IN THE SOLID PHASE)

4.74 kg of nickel nitrate and 1.71 kg of iron nitrate are dissolved in 15 l of distilled water with heating and stirring and stirred up into a suspension with 15 kg of ammonium paratungstate. An ochre coloured powder is obtained after spray drying and reannealing. According to X-ray diffraction, this powder consists of a nickel-iron tungstate and tungsten oxide. The oxide mixture is then reduced with hydrogen at a maximum temperature of 800° C. in a conventional reducing oven to produce the heavy metal-alloy composite powder.

According to ESCA analysis the powder consists of sub-micron tungsten particles in addition to nickel-iron-alloy powder in uniform distribution.

According to chemical analysis, the powder has the following composition:

Tungsten 90.64%, iron 2.06%, nickel 7.08%, oxygen 0.20%.

Grain size analysis with a SHIMADZU centrifuge shows a grain size distribution with an average grain size (D 50/50) of 0.3 $\mu$m (according to FIG. 1) after 10 minutes' dispersion of the deagglomerated particles in water by a shearing field.

The particle size distribution may be seen from FIG. 1, in which the particle diameter (μm) is entered along the abscissa against the rate of passage (vol.-%).

Test of sintered samples

Figure 2:
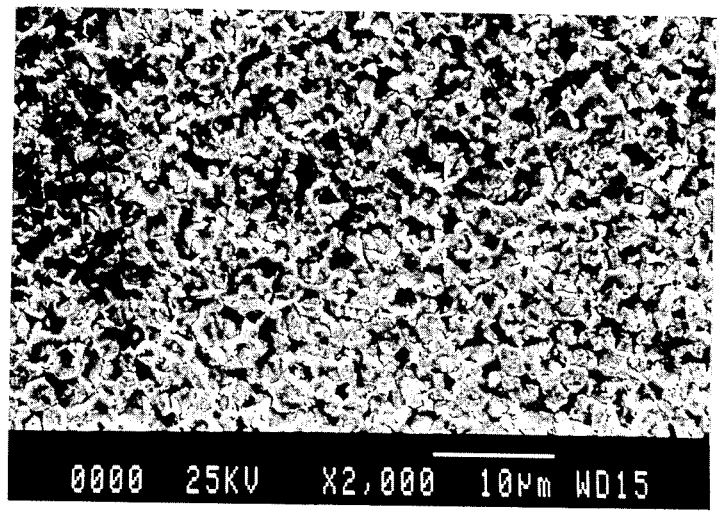
FIG. 2 is an REM photograph of the sintered test sample of powder of this invention.

Compression, presintering under a stream of hydrogen (6 hours at 920° C.) and dense sintering at 1250° C. for 4 hours are followed by degasification at the same temperature in a vacuum ($10^{-4}$ Torr) for 30 minutes. Samples tested for tensile strengths give the following values after cooling: Tensile strengths <1200 N/mm² at elongations of from 20 to 30%. The density is found to be 17.3 g/cm³ and a ground section prepared to reveal the structure shows polygonal W-grains in a pore-free matrix. The structure of the sintered test samples is shown in the REM photographs of FIG. 2.

EXAMPLE 2 (TUNGSTEN-RHENIUM ALLOY POWDER)

25 Liters of an ammonium metatungstate solution containing 21.9 g/l of rhenium in the form of ammonium perrhenate in addition to 170 g/l of $WO_3$ are spray dried in a spray drier (compact installation of ANHYDRO AS/Denmark) to form an oxide mixture. The dry product is then reduced in a gas-tight pusher type furnace with a residence time of 4 hours under a stream of hydrogen of about 1.6 m/s at a temperature of 750° C.

The reaction results in a heterogeneous alloy powder having the composition, tungsten:rhenium=90/10.

The heterogeneous alloy powder is subjected to an 8 hours diffusion treatment at 1300° C. to develop the mixed crystal phases. This is again carried out in a hydrogen atmosphere in a closed crucible furnace.

The product obtained is a homogeneous alloy powder of tungsten/rhenium which according to X-ray fine structural analysis contains no free rhenium.

The average grain size of the finished alloy powder is 0.8 μm (according to FSSS) and the powder density is found to be 28.3 inch/cm³.

Metallographic investigation of a sintered sample of this material by microprobe confirms the uniform distribution of elementary rhenium throughout the test sample.

What is claimed is:

1. Metal powder agglomerates of individual particles comprising (i) more than 70% by weight of one or more metals selected from the group consisting of the elements molybdenum, rhenium and tungsten and (ii) one or more binder metals selected from the group consisting of iron, cobalt, nickel, copper, silver, gold, palladium, platinum, rhodium, chromium and rhenium, wherein the individual particles have grain sizes of less than 2 μm and all the metal particles lie side by side in uniform random distribution, wherein both (i) and (ii) are not both rhenium.

2. Metal powder agglomerates according to claim 1, having an oxygen content of less than 1.5% by weight, with the grain size of the agglomerates less than 300 μm and the grain size of the individual particles less than 1 μm.

3. Metal powder agglomerates according to claim 2, wherein the grain size of the individual particles is less than 0.6 μm and the oxygen content is less than 1.0% by weight.

* * * * *

REEXAMINATION CERTIFICATE (2150th)
United States Patent [19]
Schütz et al.

[11] B1 4,915,733
[45] Certificate Issued Dec. 14, 1993

[54] AGGLOMERATED METAL COMPOSITE POWDERS

[75] Inventors: Heinz-Eckert Schütz, Goslar; Bernhard Szesny, Langelsheim; Bruno E. Krismer, Goslar, all of Fed. Rep. of Germany

[73] Assignee: Hermann C. Starck Berlin GmbH & Co. KG, Berlin, Fed. Rep. of Germany

Reexamination Request:
No. 90/002,890, Nov. 16, 1992

Reexamination Certificate for:
Patent No.: 4,915,733
Issued: Apr. 10, 1990
Appl. No.: 298,995
Filed: Jan. 19, 1989

[30] Foreign Application Priority Data
Jan. 30, 1988 [DE] Fed. Rep. of Germany ....... 3802811

[51] Int. Cl.$^5$ ............................................. C22C 28/00
[52] U.S. Cl. .................................. 75/228; 75/229; 75/255; 75/351; 75/355; 420/432; 420/433; 420/429
[58] Field of Search ............... 75/228, 229, 255, 351, 75/355; 419/23, 34; 420/433, 432, 429

[56] References Cited
U.S. PATENT DOCUMENTS

| | | | |
|---|---|---|---|
| 2,431,691 | 12/1947 | Newman | 266/252 |
| 3,337,327 | 8/1967 | Jordan et al. | 75/355 |
| 3,418,103 | 12/1968 | Lasdon | 75/351 |
| 3,623,860 | 11/1971 | Cheney et al. | 75/351 |
| 3,652,746 | 3/1972 | Bargainnier | 264/14 |
| 3,663,667 | 5/1972 | Cheney et al. | 264/14 |
| 4,216,009 | 8/1980 | Miyake et al. | 75/351 |
| 4,384,884 | 5/1983 | Miyake et al. | 75/352 |
| 4,498,395 | 2/1985 | Kock et al. | 428/570 |
| 4,584,078 | 4/1986 | Nakanouchi et al. | 75/255 |
| 4,613,371 | 8/1986 | Cheney et al. | 75/255 |
| 4,678,511 | 7/1987 | Yasuoka et al. | 75/255 |
| 4,775,414 | 10/1988 | Shoji | 75/255 |

FOREIGN PATENT DOCUMENTS

| | | |
|---|---|---|
| 98944 | 4/1984 | European Pat. Off. |
| 2078508 | 11/1971 | France . |
| 73202 | 9/1953 | United Kingdom . |

*Primary Examiner*—R. Dean

[57] ABSTRACT

Metal powder agglomerates of individual particles comprising (i) more than 70% by weight of one or more metals selected from the group consisting of the elements molybdenum, rhenium and tungsten and (ii) one or more binder metals selected from the group consisting of iron, cobalt, nickel, copper, silver, gold, palladium, platinum, rhodium, chromium and rhenium, wherein the individual particles have grain sizes of less than 2 μm and all the metal particles lie side by side in uniform random distribution are useful as the powder required for producing shaped, sintered articles in a powder metallurgical preparation.

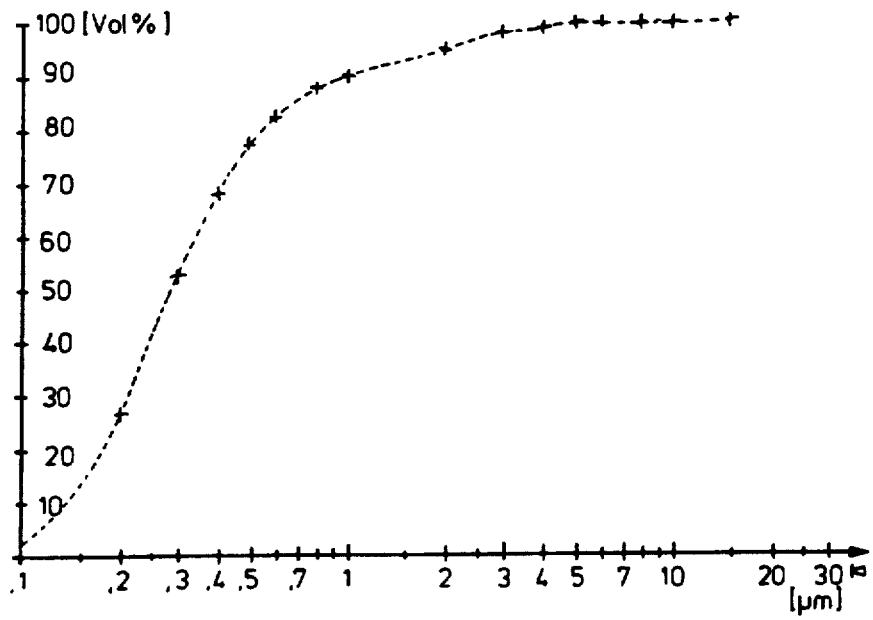

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2 and 3, dependent on an amended claim, are determined to be patentable.

1. Metal powder agglomerates of individual particles comprising (i) more than 70% by weight of one or more metals selected from the group consistitng of the elements molybdenum, rhenium and tungsten and (ii) one or more binder metals selected from the group consisting of iron, cobalt, nickel, copper, silver, gold palladium, platinum, rhodium, chromium and rhenium, wherein the individual particles have grain size of less than 2 $\mu$m and all the metal particles lie side by side in uniform random distribution, wherein both (i) and (ii) are not both rhenium *and having an oxygen content of less than 1.5% by weight.*

* * * * *